INVENTORS
Walter Schaelchlin
and Kurt Mahnke.
BY Paul E. Friedemann
ATTORNEY

Patented July 22, 1947

2,424,255

UNITED STATES PATENT OFFICE 2,424,255

CONTROL SYSTEM FOR ELECTRIC HOISTS

Walter Schaelchlin and Kurt Mahnke, Forest Hills, Pa., assignors to Westinghouse Electric Corporation, East Pittsburgh, Pa., a corporation of Pennsylvania Application August 10, 1945, Serial No. 610,128

7 Claims. (Cl. 172—152)

Our invention relates to electric hoist control systems and especially to systems for controlling the operation of marine winches.

Winch controllers are now available in which a load-responsive field fluttering relay is series-connected in the armature circuit of the winch motor and controls a resistor in a separately excited motor field circuit so as to weaken the field when the motor load current decreases below a given value. Due to this function of the relay, the motor, when lowering a light or empty hook, will run at increased speed which is desirable for fast cargo handling.

Controllers with such a relay, however, require experienced and cautions handling and may otherwise cause damage and danger because a momentary overspeed is apt to occur if the operator moves the master switch too rapidly to the high speed lowering position. This is due to the fact that during the transition from motoring to overhauling the motor load current is low and hence the field relay caused to provide a minimum field. As a result, the motor has the tendency to accelerate quickly to an extreme lowering speed before the field relay becomes effective to strengthen the motor field and to then reduce the speed.

It is an object of our invention to provide a hoist control system, applicable for winches, which while being provided with a load-responsive field control relay in order to afford the advantage of the above-mentioned known controllers, is free of the tendency to run temporarily at overspeed when lowering a light hook and thus eliminates the danger or the necessity of special skill inherent in the known systems.

According to our invention, a load relay of the non-fluttering type for controlling the resistance of the separately excited motor field is provided with two control coils of which one is series-connected in the armature circuit of the motor while the other coil is controlled in dependence upon the position of the master switch so that the relay is caused to maintain a strong motor field in all lowering positions of the master switch with the exception of the position for highest lowering speed. Consequently, the field remains strong during the interval of control movement of the master switch regardless of the speed with which the switch is operated and regardless of the magnitude of the motor load current flowing during that interval. Only after the switch has reached the positive of highest lowering speed is the load-responsive coil of the relay effective to cause either the maintenance of the strong field or a reduction in field strength depending upon the value of the load current.

According to another feature of our invention, we provide the load-responsive field relay with timing means in order to delay the weakening of the motor field for a short interval of time after the master switch has reached the position of highest lowering speed. The motor is thus permitted to pass from motoring to overhauling condition if the hook load is sufficiently large. The current in the load-responsive relay coil may then increase to further maintain the relay in the field strengthening position.

The invention is exemplified by the embodiment of a winch control system described hereinafter in conjunction with the drawing in which.

Figure 1:
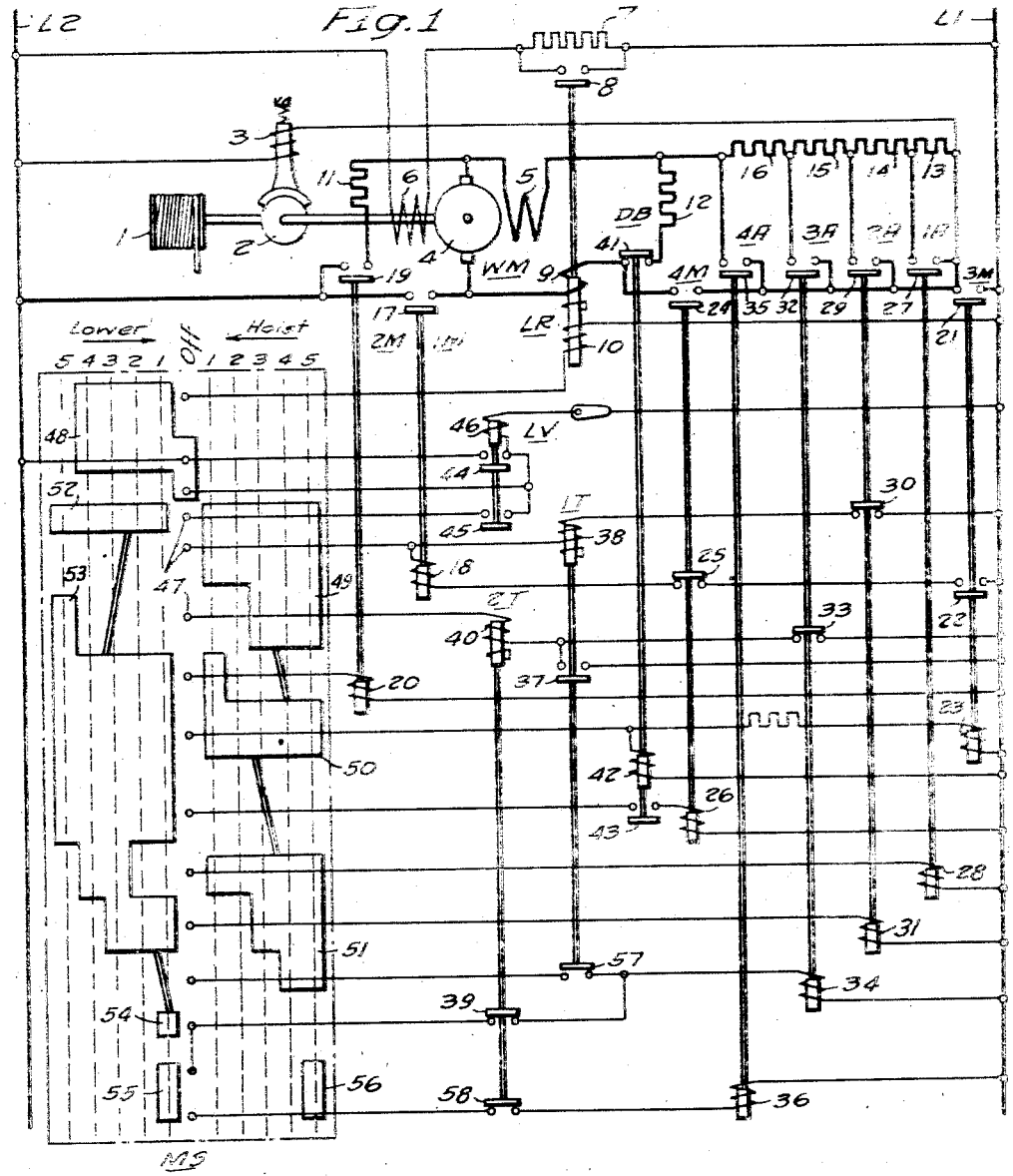
Figure 1 represents a circuit diagram of the system.

Referring to Figure 1, numeral 1 denotes a drum for accommodating the hawser of a hoist or winch. A friction brake 2 is provided for stopping the drum. This brake is mechanically set by means of a spring and has a magnet core 3 which releases the brake when energized from the mains L1 and L2 of a suitable direct-current source. The hawser drum is geared to the armature of a winch motor WM which has a self-excited field winding 5 and a separately excited field winding 6. Winding 5 is designed for operation either in series of shunt connection depending upon the control condition of the system, while winding 6 is connected to the above-mentioned mains L1 and L2 through a resistor 7 under control by the contact 8 of a load relay LR. Relay LR has a current coil 9 connected in the circuit of armature 4 and is also provided with a voltage coil 10 which acts together with the current winding 9 on the same relay armature and receives excitation from the mains L1 and L2 under control by a master switch MS. Relay LR has a delayed dropout. In the illustrated embodiment, the delay is obtained by means of a short-circuited winding which is magnetically associated with the relay armature.

Several resistors denoted by 11, 12, 13, 14, 15 and 16 are connected with the motor circuits under control by several relays denoted by 1M, 2M, 3M, 4M, 1A, 2A, 3A, 4A, and DB, respectively. Relay 1M has a contact 17 actuated by a control coil 18. Relay 2M has its contact 19 controlled by a coil 20. Relay 3M has a main contact 21 and an interlock contact 22 actuated by a control coil 23. Relay 4M has also a main contact 24 and an interlock contact 25, both actuated by a coil 26. Relays 1M, 2M, 3M and 4M control the direction of current flow through the armature 4 of the winch motor and also the connection of field winding 5 as regards its series or parallel arrangement relative to the armature 4.

Relays 1A, 2A, 3A and 4A control the acceleration characteristic of the motor by shorting the resistors 13 through 16 sequentially, thereby increasing the current in the motor armature 4. Associated with the control coils 34 and 36 of the relays 3A and 4A are two timing relays 1T and 2T. Relay 1T has two contacts 37 and 57 controlled by a coil 38, and relay 2T has two contacts 39 and 58 controlled by a coil 40.

Relay DB has a contact 41 which, when closed, connects resistor 12 across armature 4 for dynamic braking. Coil 42 of relay DB is excited in all positions of the master switch MS with the exception of the off position so that the braking resistor 12 is effective only when the control system is set for stopping the winch. An interlock contact 43 in relay DB is disposed in the coil circuit of relay 4M and prevents relay 4M from being energized in the off position of the master switch.

All above-mentioned relays of the control system receive excitation from mains L1 and L2 under control by the master switch MS and through a connection which extends through the contacts 44 and 45 of a low voltage relay LV whose control coil is denoted by 46.

The coil circuits of the above-mentioned relays are connected to the contact fingers, such as those denoted by 47, of the master switch MS. The switch has a number of contact segments denoted by 48 through 56, respectively, and in the illustrated example has five selective hoisting positions and five selective lowering positions.

When the mains L1 and L2 are excited by the closure of a main switch (not illustrated), the system is in operative condition and the field winding 6 of motor WM is energized, while armature 4 and field winding 5 remain deenergized as long as the master switch is in the illustrated off position due to the fact that contact 21 of relay 3M, which controls the supply of load current and field current to the motor, is in the open position. Since the excitation of the brake releasing coil 3 is also controlled by contact 21 of relay 3M, the brake remains set. The closure of the main switch, however, has the effect of energizing coil 46 of relay LV in the circuit L1, 46, 48, L2 and closes a self-holding circuit at contact 44. Consequently, when thereafter the master switch is turned out of the off position, relay LV stays picked up through contact 44 as long as the voltage between mains L1 and L2 remains sufficiently high. In the case of voltage failure, relay LV drops out and can be reset only by returning switch MS to the off position. With relay LV in the picked up condition, the current for energizing all other relays is supplied from main L1 through contacts 44 and 45 and thence through either segment 49 or 52 of switch MS, provided the switch is in any of its hoisting or lowering positions. Consequently, when during the operation of the winch the relay LV drops out due to voltage failure, all other relays are deenergized so that the motor is stopped and the brake 2 put in operation.

When, starting from the illustrated off position, the master switch MS is turned into the first hoisting position, the following operations take place. Relay 3M picks up in circuit L1, 23, 50, 49, 45, 44, L2, and closes contacts 21 and 22. Relay 1M picks up in circuit L1, 22, 25, 18, 49, 45, 44, L2, and closes contact 17. Timing relay 1T picks up in circuit L1, 30, 38, 49, etc. Relay 2M picks up through L2, 20, 50, 49, etc., and closes contact 19. Relay DB picks up because its coil 42 lies in parallel to coil 23 of relay 3M. Hence, contact 41 opens and disconnects the dynamic braking resistor 12. Relay 1A picks up in circuit L1, 51, 50, 49, etc. The closure of contact 21 in relay 3M causes coil 3 to release the friction brake 2. Armature 4 and field winding 5 of motor WM are now energized in series connection in the circuit L1, 21, 27, 14, 15, 16, 5, 4, 17, L2, with resistor 11 connected at 19 in shunt relation to the armature 4. In other words, the resistors 14, 15 and 16 are now effective in series connection with field winding 5 and armature 4 and the voltage across the armature 4 is lowered by resistor 11. As a result, the motor is energized for operation in the hoisting direction and for development of lowest hoisting effort.

On second point hoisting of switch MS, the above-mentioned control conditions are maintained with the exception that relay 2M drops out due to the interruption of its coil circuit. Contact 19 opens and disconnects the shunt resistor 11 for operation at increased speed or torque.

On third point hoist, relay 2A picks up through L1, 31, 51, 50, 49, etc., and short-circuits the resistor 14 at contact 29 while opening the interlock contact 30. Timing relay 1T drops out with delay and closes its contact 57, thereby preparing a circuit for coil 34 of relay 3A. Timing relay 2T picks up through L1, 33, 37, 40, 49 etc. The closure of contact 29 in relay 2A completes a short circuit for resistor 14 and hence causes a further increase in hoisting speed or torque.

On point four hoist, relay 3A comes in through circuit L1, 34, 57, 51, etc., and shorts resistor 15 at 32 for a further increase in hoisting speed or torque. Time relay 2T drops out due to the interruption of its coil circuit at 33, and closes contact 58 with delay, thereby preparing the coil circuit for relay 4A.

On point five hoist, relay 4A picks up through L1, 36, 58, 56, 51, etc., and shorts resistor 16 at contact 35 for maximum hoisting speed.

When returning the master switch to the off position, the above-mentioned control steps are performed substantially in the reverse sequence.

The performance of the control system during lowering operations is as follows:

Starting with the illustrated off position, the positioning of switch MS on point one lower has the effect of energizing coil 20 of relay 2M in the circuit L1, 20, 53, 52, 45, 44, L2. Contact 19 is closed so that the shunt resistor 11 is effective. Relay 3M is energized through L1, 23, 53, 52, etc., so that the brake 2 is released. Relay DB picks up and opens its contact 41 because its coil 42 is energized in parallel to coil 23 of relay 3M. Relay 4M comes in through L1, 26, 42, 53, etc., and opens contact 41. Relay 2A picks up in circuit L1, 31, 53, etc., and short resistor 14 at contact 29. Relay 3A picks up through L1, 34, 39, 54, 53, etc., and shorts resistor 15. Relay 4A comes in over L1, 36, 58, 55, 54, 53, etc., and shorts resistor 16. The armature circuit of motor WM is now closed through L1, 21, 24, 9, 4, 11, 19, L2, and the field winding 5 is connected in parallel to the armature 4 through contacts 35 and 24. The motor is now energized for low speed lowering operation with resistors 14, 15 and 16 short-circuited and the armature energized in series connection with resistors 11 and 13 by a current whose direction is opposite to that effective during the above-mentioned hoisting operations. The armature current flows through coil 9 of the load relay LR. However, this coil is rendered ineffective due to the fact that coil 10 of the same relay is energized in all lowering positions except the fifth and causes relay LR to close contact 8, thus placing increased excitation on the separately excited field winding 6 in order to reduce the motor speed accordingly.

One second point lower, relay 4A drops out and opens contact 35. Resistor 16 is inserted in the circuit of field winding 5 and weakens the field in order to increase the lower speed.

On third point lower, relay 1A picks up in circuit L1, 28, 53, etc., and closes contact 27, thereby short-circuiting the resistor 13. Relay 3A drops out and opens contact 32, thereby inserting the resistor 15 in the circuit of field winding 5 for a further weakening of the field excitation.

On the fourth point lower, relay 2A drops out and increases the resistance in the motor field circuit by adding the resistor 14. As mentioned, the relay LR stays in during all above-mentioned lowering operations.

On fifth point lower, relay 1A drops out and adds resistor 16 in series with field winding 5 of the motor. At the same time, the circuit of coil 10 is interrupted at contact 48 so that relay LR is now free to respond to the condition of coil 9. However, the effect of coil 10 vanishes with delay. Hence, contact 8 remains closed for an additional interval of time and maintains full excitation on field winding 6. This permits the motor to pass from motoring to overhauling condition in cases where the load on the hook is sufficiently high. In such cases, the current in coil 9 will increase and maintain the relay LR closed before the latter has time to drop out and to produce a weak field condition. If the load on the hook is insufficient to cause an overhauling condition, the current in coil 9 remains too low for closing the contact 8 upon the expiration of the above-mentioned timing interval. Consequently, relay LR will then drop out and insert the resistor 7 in the circuit of field winding 6, thereby weakening the field excitation of the motor in order to increase the lowering speed.

Figure 2:
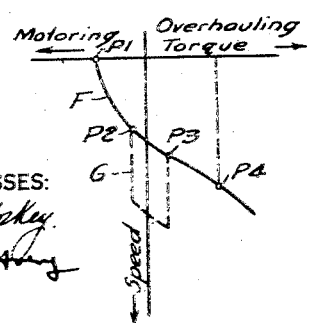
Fig. 2 is a typical speed torque characteristic as occurring due to the invention when the master switch is rapidly placed in the position of highest lowering speeds; while Fig. 3, for comparison, shows a speed-torque diagram typical of the condition obtaining in control systems with a field fluttering relay of the known type referred to in the foregoing.
Figure 3:
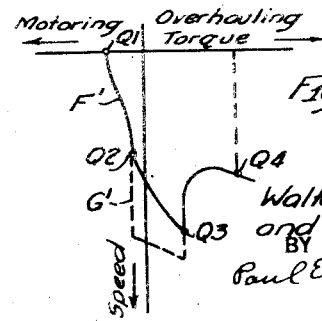

The performance of the load relay will be more fully understood from the following reference to the schematic diagrams in Figs. 2 and 3. Both diagrams show a typical speed torque characteristic as occurring when moving the master switch set rapidly from off to fifth point lowering. The diagram, according to Fig. 2, exemplifies conditions obtaining in a system which is designed and operative in accordance with the invention and as described in the foregoing in conjunction with Fig. 1. The diagram of Fig. 3, in comparison, represents a typical speed torque characteristic as occurring in a system of the known type mentioned previously in this specification.

The transient speed torque conditions occurring during the acceleration of the winch motor in a system according to Fig. 1 when a load is lowered with the master controller quickly moved to point 5, lower, are typified by the curve F in Fig. 2. Starting at point P1, the lowering speed increases at a declining motor torque. When the hook load is sufficient to produce overhauling torque, the load relay LR will stay in, as mentioned previously, so that the field winding 6 of the motor continues to receive full excitation. In this case, the characteristic will continue steadily through points P2 and P3 to the final operating point P4 depending upon the magnitude of the load.

A comparison of the above-described characteristic with the diagram according to Fig. 3 will elucidate the new performance and advantages of the present invention. According to Fig. 3, which it will be remembered refers to a load-responsive field weakening relay that is not dependent on the position of the master switch, the speed torque characteristic F' for point 5 lowering under transient acceleration conditions extend from point Q1 through points Q2 and Q3 to the final load point Q4. Due to the fact that the motor-load current is low during the transition between motoring and overhauling, the load-responsive relay does not respond, so that the separately excited motor field remains weak and causes the motor to accelerate rapidly to a temporary overspeed which is reduced only after the load current reaches a sufficient magnitude. This reduction occurs at point Q3 in Fig. 3. The response of the relay has the effect of causing the motor to thereafter run at a lower speed in accordance with point Q4. It thus will be seen that, when the master controller is turned from off to fifth point lower at excessive speed, the motor may develop a temporary overspeed which leads to overstress, jerky operation and may entail danger to the operating crew. In systems according to the invention, these disadvantages are fully eliminated and the motor condition remains always under safe control regardless of the speed with which the master switch is actuated. For the sake of completness, Figs. 2 and 3 indicate also the speed torque characteristic occurring at steady state operation, i. e., under steady conditions, the characteristics extend also along curves F or F' except that they then follow the lines G or G' between points P2, P3 and points Q2, Q3 respectively.

It will be understood by those skilled in the art that control systems according to the invention may be modified as to details without departing from the principal and essential features of the invention. For instance, while we have shown an embodiment in which the voltage coil of the load-responsive relay is energized directly through a contact of the master switch, it is readily possible to tie this voltage coil up with one of the other relays of the system. For instance, the relay 1A, as illustrated in the drawing, can be made to pick up during points one through four lower of the master switch, and the coil 10 of the load relay LR can be energized together with the coil of relay 1A or it may be energized by a contact actuated by relay 1A. These and other possibilities of modifying the invention are not illustrated in the drawing because they will be obvious to those skilled in the art.

We claim as our invention:

1. A hoist control system, comprising a hoist motor, control means connected to said motor and including a master switch having a plurality of hoisting and lowering positions for causing said motor to operate at different speeds in the hoisting and lowering directions respectively, circuit means for providing controllable field excitation for said motor, a relay disposed for controlling said circuit means to increase and decrease said field excitation and having two control coils, one of said coils being connected to said motor so as to respond to the load current of said motor in order to provide increased field excitation when said current exceeds a given magnitude, said other coil being connected with said control means so as to provide increased field excitation when said master switch is in position for lowering speeds and decreased field excitation when said switch is in a position for high lowering speed.

2. A hoist control system, comprising a hoist motor having an armature circuit and a shunt field circuit, control means connected to said armature circuit and including a master switch having a plurality of hoisting and lowering positions for causing said motor to operate at different speeds in the hoisting and lowering directions respectively, resistance means disposed in said field circuit, an electromagnetic relay having contact means connected with said resistance means for controlling the field excitation of said motor, said relay having two coils for controlling said contact means, one of said coils being connected with said armature circuit in order to respond to the load current of said motor so as to provide increased field excitation when said current exceeds a given magnitude, said other coil being connected with said control means so as to provide increased field excitation when said master switch is in position for low lowering speeds and decreased field excitation when said switch is in a position for high lowering speed.

3. A hoist control system, comprising a compound hoist motor having an armature circuit and a shunt field circuit, control means connected to said armature circuit and including a master switch having a plurality of hoisting and lowering positions for causing said motor to operate at different speeds in the hoisting and lowering directions respectively, resistance means disposed in said shunt field circuit, a relay having two control coils and being disposed for controlling said resistance means to vary the field excitation of said motor, one of said coils being connected with said armature circuit in order to respond to the load current of said motor so as to provide increased field excitation when said current exceeds a given magnitude, said other coil being connected to said control means in order to be energized in dependence upon the position of said master switch so as to provide increased field excitation in all lowering positions of said switch except the position for highest lowering speed.

4. A hoist control system, comprising a motor, control means connected to said motor and having a master switch with a plurality of positions for controlling said motor to operate at different speeds for hoisting and lowering respectively, circuit means for providing adjustable field excitation for said motor, a relay having two coils for controlling said circuit means, one of said coils being connected with said motor so as to respond to the motor load current in order to provide high field excitation when said current exceeds a given magnitude, said other coil being connected with said control means in order to be energized in dependence upon the position of said master switch so as to provide high field excitation when said switch is in a position for low lowering speeds and low field excitation when said switch is in a position for high lowering speed, and timing means associated with said relay for delaying the change from high to low field excitation for a given interval after said switch is placed into said position for high lowering speed.

5. A hoist control system, comprising a hoist motor having an armature circuit and a shunt field circuit, control means connected to said armature circuit and including a master switch having a plurality of hoisting and lowering positions for causing said motor to operate at different speeds in the hoisting and lowering directions respectively, resistance means disposed in said field circuit, an electromagnetic relay having contact means connected with said resistance means for controlling the field excitation of said motor, said relay having two coils for controlling said contact means, one of said coils being connected with said armature circuit in order to respond to the load current of said motor so as to provide increased field excitation when said current exceeds a given magnitude, said other coil being connected to said control means in order to be energized in dependence upon the position of said master switch so as to provide increased field excitation in all lowering positions of said switch except the position for highest lowering speed, and timing means associated with said relay for delaying the change from increased to decreased field excitation a given interval of time after said switch is placed into said position for highest lowering speed.

6. A hoist control system, comprising a hoist motor having an armature circuit and a separately excited field circuit, means disposed for controlling the excitation of said field circuit and connected with said armature circuit to strengthen said excitation when the load current in said armature circuit exceeds a given magnitude, operator-actuated master control means connected to said motor for causing it to selectively operate at different hoisting and lowering speeds, and means under control by said master control means to render said load responsive control means ineffective when said master controller is set for lowering with the exception of the setting for highest lowering speed.

7. A control system for winches, comprising a winch motor having an armature circuit and a separately excited field circuit, resistance means disposed in said field circuit, an electromagnetic relay disposed for controlling said resistance means and having two control coils, one of said coils being connected with said armature circuit in order to respond to the load current of said motor so as to provide increased field excitation when said current exceeds a given magnitude, control means comprising a selective multi-position master switch having contacts adjustable into a plurality of hoisting and lowering positions and relay means disposed between said switch contacts and said armature circuit for causing said motor to operate at different selective hoisting and lowering speeds, said other coil of said relay being also connected to said switch contacts so as to be energized when said switch is placed in any lowering position except the one for highest lowering speed in order to permit said load-responsive coil to cause an increase in field excitation during lowering operations only in said highest speed lowering position of said switch.

WALTER SCHAELCHLIN.
KURT MAHNKE.